(12) United States Patent
Storck et al.

(10) Patent No.: US 10,953,464 B2
(45) Date of Patent: Mar. 23, 2021

(54) EMPOWERING ADDITIVE MANUFACTURING METALS AND ALLOYS AGAINST LOCALIZED THREE-DIMENSIONAL CORROSION

(71) Applicant: The Johns Hopkins University, Baltimore, MD (US)

(72) Inventors: Steven M. Storck, Timonium, MD (US); Rengaswamy Srinivasan, Ellicott City, MD (US); Paul J. Biermann, Columbia, MD (US)

(73) Assignee: The Johns Hopkins University, Baltimore, MD (US)

( * ) Notice: Subject to any disclaimer, the term of this patent is extended or adjusted under 35 U.S.C. 154(b) by 132 days.

(21) Appl. No.: 15/818,824

(22) Filed: Nov. 21, 2017

(65) Prior Publication Data
US 2018/0141120 A1 May 24, 2018

Related U.S. Application Data

(60) Provisional application No. 62/425,140, filed on Nov. 22, 2016.

(51) Int. Cl.
| | |
|---|---|
| *B22F 1/02* | (2006.01) |
| *B22F 1/00* | (2006.01) |
| *B33Y 70/00* | (2020.01) |
| *B33Y 10/00* | (2015.01) |
| *B22F 10/20* | (2021.01) |

(52) U.S. Cl.
CPC ............ *B22F 1/025* (2013.01); *B22F 1/004* (2013.01); *B22F 1/0011* (2013.01); *B22F 1/0018* (2013.01); *B22F 1/0025* (2013.01); *B22F 1/02* (2013.01); *B22F 10/20* (2021.01); *B33Y 10/00* (2014.12); *B33Y 70/00* (2014.12); *B22F 2301/205* (2013.01); *B22F 2302/25* (2013.01); *B22F 2302/253* (2013.01); *B22F 2304/10* (2013.01); *Y02P 10/25* (2015.11)

(58) Field of Classification Search
None
See application file for complete search history.

(56) References Cited

U.S. PATENT DOCUMENTS 3,645,782 A * 2/1972 Johnson ............ B23K 35/3066
219/146.41
3,775,100 A * 11/1973 Kizer ...................... B22F 1/025
419/35

(Continued)

FOREIGN PATENT DOCUMENTS

KR       2015/0132043       * 11/2015

OTHER PUBLICATIONS

John H. Martin, et al., "3D printing of high-strength aluminium alloys," Nature, vol. 549, Sep. 21, 2017, doi:10.1038/ nature23894, pp. 365-379.

*Primary Examiner* — Xiaobei Wang
(74) *Attorney, Agent, or Firm* — Noah J. Hayward

(57) ABSTRACT

Functionalized metallic feedstock and three-dimensional articles formed therefrom via an additive manufacturing process are provided. The functionalized metallic feedstock includes a plurality of discrete metallic substrates including a first metallic substrate having a first surface area, in which at least a portion of the first surface area comprises a functionalizing agent selected to render the first metallic substrate resistant to corrosion.

4 Claims, 9 Drawing Sheets

(56) References Cited

U.S. PATENT DOCUMENTS

| | | | | |
|---|---|---|---|---|
| 6,180,918 B1* | 1/2001 | Semenov | ............... | B23K 9/186 |
| | | | | 219/137 WM |
| 2004/0055419 A1* | 3/2004 | Kurihara | ............. | C04B 41/4584 |
| | | | | 75/362 |
| 2006/0045787 A1* | 3/2006 | Jandeska, Jr. | ......... | B33Y 70/00 |
| | | | | 419/47 |
| 2008/0264924 A1* | 10/2008 | Duncan | .............. | B23K 35/0266 |
| | | | | 219/145.1 |
| 2011/0045174 A1* | 2/2011 | Maeda | ...................... | H01F 3/08 |
| | | | | 427/127 |
| 2013/0057371 A1* | 3/2013 | Shimoyama | .............. | H01F 1/33 |
| | | | | 335/297 |
| 2014/0127069 A1* | 5/2014 | Bae | ....................... | C22C 1/1036 |
| | | | | 419/19 |
| 2015/0217408 A1* | 8/2015 | Kawasaki | .............. | C22C 12/00 |
| | | | | 174/126.2 |
| 2020/0188995 A1* | 6/2020 | Shibuya | .............. | C23C 18/1637 |

* cited by examiner

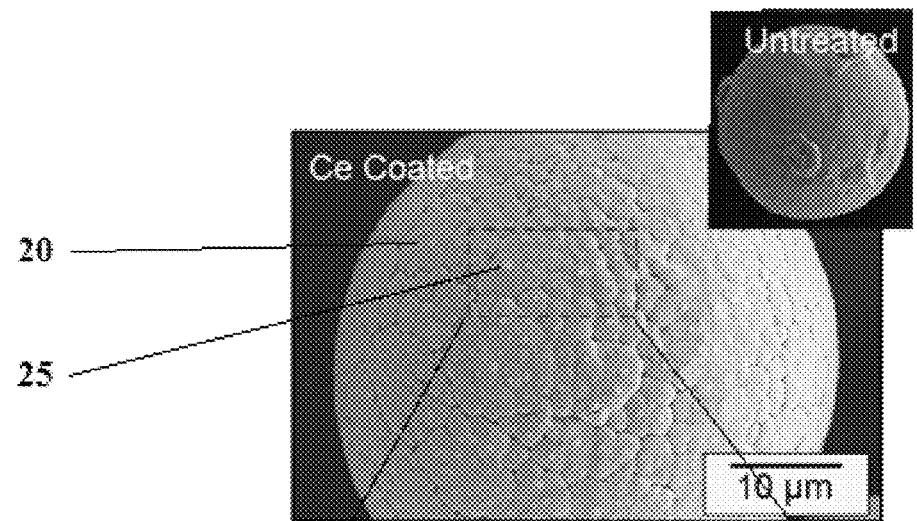
Figure 8A
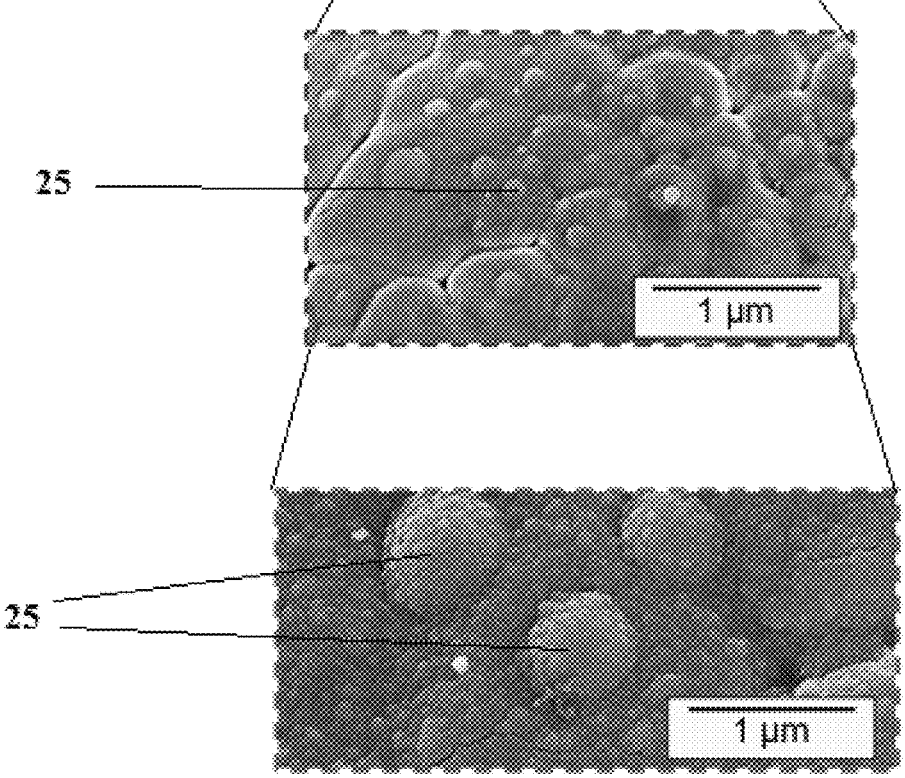
Figure 8B
Figure 8C

EMPOWERING ADDITIVE MANUFACTURING METALS AND ALLOYS AGAINST LOCALIZED THREE-DIMENSIONAL CORROSION

CROSS-REFERENCE TO RELATED APPLICATIONS

This application claims priority under 35 U.S.C. § 119(e) to U.S. Provisional Application Ser. No. 62/425,140, filed on Nov. 22, 2016, which is expressly incorporated by reference herein in its entirety.

TECHNICAL FIELD

Embodiments of the presently-disclosed invention relate generally to functionalized metallic feedstock materials that may be used in additive manufacturing (AM) processes to provide three-dimensional (3D) metallic articles having corrosion resistant/inhibiting properties throughout the bulk (e.g., the 3D volume of the article) of the metallic article.

BACKGROUND

Similar to metals and metal alloys that are fabricated through conventional processes such as melting, casting and forging, those that are fabricated through additive manufacturing (AM) processes also degrade due to corrosion. In some AM alloys, the rates of corrosion are known to be orders-of-magnitude higher than in their respective cast and forged alloys. In conventional alloys, corrosion mitigation is frequently made through surface conversion coatings or corrosion inhibitor additives. Conversion coating is a surface modification technique that generates a corrosion-resistant or passive layer on the surface of the metal. The most famous example of conversion coating is anodized aluminum. A conversion coating is effective against corrosion only if it remains undamaged, not modified further through mechanical aberration or chemical oxidation. Another approach to mitigate corrosion has been the use of corrosion inhibitors. Corrosion inhibitors are typically added to the environment or the medium surrounding the alloy's surface, and they lose their effectiveness when the environment or surrounding medium changes. Once the conversion-coated surface layer or the corrosion inhibitor is removed, even locally, the alloy will corrode in that location. The localized corrosion may then propagate three-dimensionally into the bulk of the object. Such a propagation of corrosion into the bulk frequently manifests as pitting corrosion, stress corrosion cracking, etc., conditions that have been identified as major reasons why objects fabricated using conventional alloys undergo catastrophic failure.

Therefore, there remains a need in the art for functionalized metallic feedstock materials that may be used in AM processes to provide three-dimensional (3D) metallic articles having corrosion resistant/inhibiting properties throughout the bulk (e.g., the 3D volume of the article) of the metallic article. In this regard, there also remains a need in the art for 3D metallic articles that is resistant to corrosion throughout its three-dimensional volume to exhibit improved resistance to pitting and stress corrosion cracking.

BRIEF SUMMARY

One or more example, non-limiting embodiments of the invention address one or more of the aforementioned problems. Certain embodiments according to the invention provide a functionalized metallic feedstock that may be used in AM processes to provide three-dimensional (3D) metallic articles having corrosion resistant/inhibiting properties throughout the bulk (e.g., the 3D volume of the article) of the metallic article. In accordance with certain embodiments of the invention, the functionalized feedstock may comprise a plurality of discrete metallic substrates (e.g., discrete particulates and/or fibers) including at least a first metallic substrate having a first surface area, in which at least a portion of the first surface area comprises a functionalizing agent selected to render the first metallic substrate resistant to corrosion. In accordance with certain embodiments of the invention, at least a majority of the plurality of discrete metallic substrates comprise a functionalizing agent incorporated within or on the surface of the metallic substrates.

In another aspect, the invention provides a method of modifying a metallic feedstock to incorporate a functionalizing agent selected to render the metal feedstock resistant to corrosion. In accordance with certain embodiments of the invention, the method may comprise providing a plurality of discrete metallic substrates including a first metallic substrate having a first surface area and modifying at least a portion of the first surface area to include the functionalizing agent to provide a functionalized metallic feedstock as disclosed herein. In accordance with certain embodiments of the invention, the step of modifying at least a portion of the first surface area comprises forming a corrosion-resistant film comprising the functionalizing agent, physically embedding the functionalizing agent into the at least a portion of the first surface area, plating a metal onto the at least a portion of the first surface area that is reactive with a corrosive reagent to form a protective passive layer, applying the functionalizing agent as a dust-coating (e.g. a coating of dust) onto the plurality of discrete metallic substrates (e.g., during an AM process), introducing the functionalizing agent into the energy source during an AM process, or any combination thereof.

In another aspect, the present invention provides a three-dimensional (3D) metallic article. In accordance with certain embodiments of the invention, the 3D metallic article may comprise a surface area (e.g., an external surface area) formed from one or more metals and an internal volume formed from the one or more metals (e.g., three-dimensional bulk material). In accordance with certain embodiments of the invention, at least a portion of the surface area comprises one or more functionalizing agents provided in the form of an external corrosion-resistant oxide film comprising the one or more functionalizing agents and at least a portion of the internal volume comprises one or more functionalizing agents provided in the form of one or more internal corrosion-resistant oxide films comprising the one or more functionalizing agents. In accordance with certain embodiments of the invention, the 3D metallic article comprises an article formed from an additive manufacturing process.

In yet another aspect, the invention provides a method for forming a three-dimensional (3D) metallic article. In accordance with certain embodiments of the invention, the method comprises successively building up the article from a metallic feedstock via an additive manufacturing process. In accordance with certain embodiments of the invention, the metallic feedstock comprises a plurality of discrete metallic substrates having a functionalizing agent incorporated thereon (e.g., directly as an oxide film containing the functionalizing agent or indirectly as a dusting of the surface with the functionalizing agent), in which the functionalizing agent may be selected to render the plurality of discrete metallic substrates resistant to corrosion. In accordance with certain embodiments of the invention, the additive manufacturing process comprises material extrusion, material jetting, binder jetting, sheet lamination, powder bed fusion, and directed energy systems such as selective laser melting (SLM), selective laser sintering (SLS), electron beam melting (EBM), laser metal forming (LMF), laser engineered net shape (LENS), or direct metal deposition (DMD).

BRIEF DESCRIPTION OF THE DRAWINGS

Example embodiments of the invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout, and wherein:

FIG. 8A is a Scanning Electron Microscope (SEM) image of a metallic AM particle having cerium metal incorporated into the external surface of the metallic AM particle;

FIG. 8B is an enlarged/magnified Scanning Electron Microscope (SEM) image of a portion of the image from FIG. 8A;

FIG. 8C is an enlarged/magnified Scanning Electron Microscope (SEM) image of a portion of the image from FIG. 8B.

DETAILED DESCRIPTION

Figure 1A:
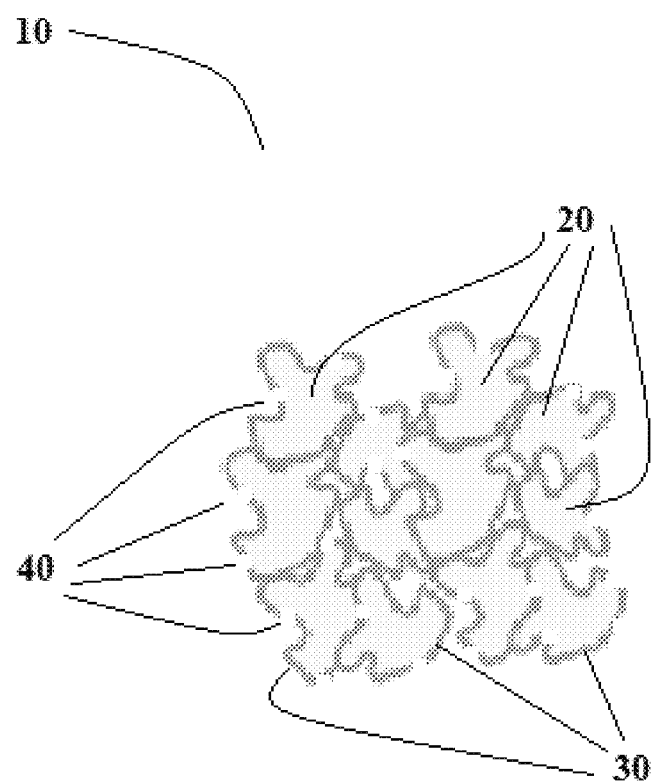
FIG. 1A is a schematic of an AM-alloy showing a magnified view of the individual precursor particles (e.g., feedstock) in which the individual precursor particles have an inherently weak surface oxide layer that is vulnerable to corrosion.

Example embodiments of the invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

The presently-disclosed invention relates generally to functionalized metallic feedstock materials that may be used in additive manufacturing (AM) processes to provide three-dimensional (3D) metallic articles having corrosion resistant/inhibiting properties throughout the bulk (e.g., the 3D volume of the article) of the metallic article. In this regard, the process of making three-dimensional (3D) metallic articles via an AM process provides opportunities for new means of mitigating corrosion, in accordance with certain embodiments of the invention, in ways that are not possible in conventional cast and forged alloys. In accordance with certain embodiments of the invention, a 3D metallic article formed, for example, from a desired alloy may comprise a functionalizing agent (e.g., a chemical species selected to impart corrosion resistance) dispersed throughout its three-dimensional volume, while the presence of the functionalizing agent (e.g., in a form of a oxide film or metal powder coating) does not negatively impact the physical or metallurgical properties in any measurable amount. Such 3D metallic article may be considered to be fully resistant to corrosion, not just at its two-dimensional outer surface, but also throughout its three-dimensional volume. Certain embodiments in accordance with the invention, for example, may desirably exhibit better resistance to pitting, inter-granular, intra-granular, hydrogen embrittlement and stress corrosion cracking due to the internal incorporation of the functionalizing agent dispersed throughout its three-dimensional volume. Stated somewhat differently, in conventional alloys the application of corrosion inhibitors or conversion coatings cannot be built into the bulk (e.g., three-dimensional volume) of the alloy (e.g., 3D metallic article). Unlike, the conventional alloys (e.g., 3D metallic article), certain embodiments of the invention comprise or demonstrate that corrosion inhibiting action can be built into the three-dimensional volume of any AM-alloy by pretreating the AM-alloy feedstock (e.g., the precursor powder or filament) appropriately to functionalize the AM-alloy feedstock to render the feedstock resistant to corrosion either prior to formation of a 3D metallic article or during formation of a 3D metallic article via an AM process.

A typical AM-alloy feedstock may typically consist of a powder of the alloy, whose particle size may vary from the nanometer scale to micron scale. The AM process uses the powder to build layer-by-layer into any desired shape and size. The use of small-sized powder alloy as the precursor (e.g., metallic feedstock) provides an opportunity to pretreat the surface of the individual particles of the feedstock appropriately and increase the overall corrosion resistance of the AM-built 3D article, not just along the outer surface of the built article but within its entire three-dimensional volume. In this regard, certain embodiments of the invention may exploits one or more inbuilt characteristics of the AM technology, including the small size of the feedstock material and the use of these small-sized particles to build 3D metallic structures layer-by-layer. For instance, certain embodiments of the invention by comprise modifying the surface of at least a portion (e.g., each feedstock particle) of the feedstock substrates (e.g., particles) in a manner that the particle is resistant to corrosion. When the 3D metallic structure is built, then the surface of each or at least a portion of the feedstock substrates (e.g., particles) in the 3D volume is inherently resistive to corrosion due to the functionalization of the feedstock substrates. In accordance with certain embodiments of the invention, the feedstock substrates may be functionalized prior to use in an AM process or functionalizing agents may be incorporated onto the feedstock substrates that will chemically react with the feedstock substrate during the structure building process, making the feedstock substrate resistant to corrosion (e.g., corrosion resistance may be imparted at the time of building the 3D article via an AM process).

Figure 1B:
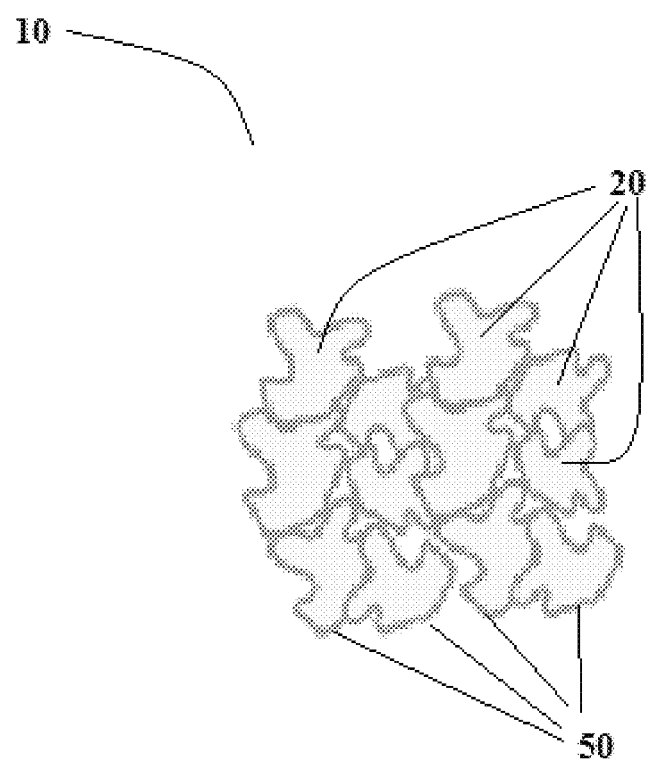
FIG. 1B is a schematic of an AM-alloy showing a magnified view of the individual precursor particles (e.g., feedstock) in which the individual precursor particles have a strengthened surface layer due to incorporation of a functionalizing agent and provide three-dimensional resistance to corrosion.

FIGS. 1A-1B, for example, schematically illustrate a magnified view of the individual AM precursor particles (e.g., feedstock) of a 3D article formed from an AM. In particular, FIG. 1A is a schematic of an AM-alloy (e.g., 3D article) 10 showing a magnified view of the individual precursor particles (e.g., feedstock) 20 in which the individual precursor particles 20 have somewhat robust oxide layer portions 30 and inherently weak surface oxide layer portions 40 that are vulnerable to corrosion. FIG. 1B is a schematic of an AM-alloy (e.g., 3D article) showing a magnified view of the individual precursor particles (e.g., feedstock) 20 in which the individual precursor particles 20 have a strengthened surface layer 50 due to incorporation of a functionalizing agent and provide three-dimensional resistance to corrosion in accordance with certain embodiments of the invention. The AM process coalesces the precursor particles (e.g., feedstock) to make the 3D articles. After the precursor particles (e.g., feedstock) are coalesced and merged to make a 3D article, the strengthened surface layer on the individual particles, in accordance with certain embodiments of the invention, imparts 3D resistance to corrosion not just at its 2D surface, but in its entire 3D volume.

In accordance with certain embodiments of the invention, the AM precursor particles (e.g., feedstock) may comprise a plurality of discrete metallic substrates (e.g., discrete powder particles and/or fibers) such as an aluminum alloy, a cobalt-based alloy, a nickel-based alloy (e.g., monel), a titanium-based alloy, an iron-based alloy, copper alloys, a chromium-bases alloy (e.g., stainless steel or chrome steel), or any combination thereof. In accordance with certain embodiments of the invention the metallic feedstock may comprise one or more metals, such as a pure metal or an alloy formed from a plurality of metals. For example, alloy AM powders of such materials can be treated (e.g., functionalized) to gain resistance against corrosion at the particle-level in accordance with certain embodiments of the invention. Such functionalized materials with reinforced surface layers containing a functionalizing agent as disclosed herein can then be used as feedstock in an AM process to create 3D articles of any desired size and shape. In accordance with certain embodiments of the invention, if the surface of the resulting 3D metallic articles are modified due to scratching, aberration, or oxidation, the modified surface may experience corrosion attack; however, the corrosion is less likely to propagate three dimensionally into the bulk of the volume of the article. In this regard, the resulting 3D metallic articles will be protected against corrosion-induced structural failure.

By way of comparison, the conventional practice of conversion coating of 3D metallic articles protects only the surface of an alloy from corrosion, and does nothing to protect the bulk of the alloy against growth of pitting corrosion, inter-granular corrosion, intra-granular corrosion, hydrogen embrittlement and stress corrosion cracking (SCC). As soon as the surface coating is damaged due to abrasion, mechanical or chemical action, the alloy with conversion coating becomes prone to three-dimensional corrosion such as pitting corrosion and SCC. To the contrary and as disclosed herein, certain embodiments in accordance with the invention provides a built-in corrosion inhibiting mechanism throughout the three-dimensional matrix of the AM alloy (e.g., 3D metallic article). In this regard, even if the surface of an AM alloy (e.g., 3D metallic article) in accordance with certain embodiments of the invention is abraded, mechanically or chemically damaged, the material beneath the damaged location is protected against corrosion.

In accordance with certain embodiments of the invention, a functionalizing agent may comprise any chemical species that can form an surface film layer that exhibits corrosion-resistance. Non-limiting examples of some functionalizing agents include inner transition metal elements such as europium and cerium, and transition metal elements such as molybdenum, tungsten, tantalum, vanadium, cobalt, chromium, or any combination thereof.

Certain embodiments according to the invention provide a functionalized metallic feedstock that may be used in AM processes to provide three-dimensional (3D) metallic articles having corrosion resistant/inhibiting properties throughout the bulk (e.g., the 3D volume of the article) of the metallic article. In accordance with certain embodiments of the invention, the functionalized feedstock may comprise a plurality of discrete metallic substrates (e.g., discrete particulates and/or fibers) including at least a first metallic substrate having a first surface area, in which at least a portion of the first surface area comprises a functionalizing agent selected to render the first metallic substrate resistant to corrosion. In accordance with certain embodiments of the invention, each of the plurality of discrete metallic substrates (e.g., particles and/or fibers/filaments) and at least a majority (e.g., at least about 75%, at least about 90%, at least about 95%, 99% or 100%) of the plurality of discrete metallic substrates comprise a functionalizing agent incorporated within or on the surface of the metallic substrates.

In accordance with certain embodiments of the invention, the plurality of discrete metallic substrates comprise a powder, a filament, or combination thereof. The average diameter of the plurality of discrete metallic substrates comprise an average diameter from about 0.01 to about 3500 microns. For instance, the average diameter of the plurality of discrete metallic substrates may comprise at most about any of the following: 3500, 3400, 3300, 3200, 3100, 3000, 2900, 2800, 2700, 2600, 2500, 2400, 2300, 2200, 2100, 2000, 1900, 1800, 1700, 1600, 1500, 1400, 1300, 1200, 1100, 1000, 900, 800, 700, 600, 500, 400, 300, 200, 100, 95, 90, 85, 80, 75, 70, 65, 60, 55, 50, 45, 40, 35, 30, 25, 20, 15, and 10 microns and/or at least about any of the following: 0.01, 0.02, 0.03, 0.04, 0.05, 0.075, 0.1, 0.25, 0.5, 0.75, 1, 1.5, 2, 5, 8, 10, 15, 20, and 25 microns.

In accordance with certain embodiments of the invention, the functionalizing agent may be provided or incorporated onto the feedstock material in a variety of forms, such as being incorporated within a corrosion-resistant oxide film comprising the functionalizing agent or in powder form. As discussed in more detail below, the incorporation of the functionalizing agent into a corrosion-resistance oxide film may be provided well in advance of any use of the feedstock material in an AM process or the corrosion-resistant oxide film comprising the functionalizing agent may be formed during the AM process forming the 3D metallic article. For example, the functionalized metallic feedstock may comprise a corrosion-resistant surface film containing one or more functionalizing agents, in which the corrosion-resistant oxide film may be formed via a chemically-deposited surface coating process. In accordance with certain embodiments of the invention, the plurality of discrete metallic substrates may individually and/or collectively comprise from about 0.02 atomic % to about 20 atomic %. For example, the plurality of discrete metallic substrates may individually and/or collectively comprise at most about any of the following: 20, 18, 15, 12, 10, 8, 6, 5, 4, 3, 2, 1, 0.75 and 0.5 atomic % and/or at least about any of the following: 0.02, 0.05. 0.08, 0.1, 0.2, 0.3, 0.4. 0.5, 0.6, 0.7, 0.8, 0.9, 1, 1.25, and 1.5 atomic %. In accordance with certain embodiments of the invention, the functionalizing agent may comprise a variety of materials that can form a corrosion-resistant oxide film including, for example, europium, cerium, cobalt, molybdenum, tungsten, tantalum, vanadium, chromium, or any combination thereof.

In accordance with certain embodiments of the invention, the functionalizing agent may be physically embedded and/or adhered onto the feedstock material. For instance, the surface of one or more of the plurality of discrete metallic substrates (e.g., feedstock) may be modified through one or more mechanical and/or chemical processes. For example, the plurality of discrete metallic substrates (e.g., feedstock) may be mechanically modified via a ball milling operation. In accordance with certain embodiments of the invention, for example, the plurality of discrete metallic substrates (e.g., feedstock) may be mechanically mixed with trace amounts of functionalizing agent (e.g., metallic powder) and then this mixture may be fed to a ball mill or the like to modify the surface of the plurality of discrete metallic substrates (e.g., feedstock) through mechano-chemical processes. In accordance with certain embodiments of the invention, the plurality of discrete metallic substrates may individually and/or collectively comprise from about 0.02 atomic % to about 20 atomic %. For example, the plurality of discrete metallic substrates may individually and/or collectively comprise at most about any of the following: 20, 18, 15, 12, 10, 8, 6, 5, 4, 3, 2, 1, 0.75 and 0.5 atomic % and/or at least about any of the following: 0.02, 0.05. 0.08, 0.1, 0.2, 0.3, 0.4. 0.5, 0.6, 0.7, 0.8, 0.9, 1, 1.25, and 1.5 atomic %. In this regard, for example, the functionalizing agent may be physically adhered or embedded (at least partially) onto and/or into at least a portion the surface of at least a majority of the discrete metallic substrates (e.g., feedstock). In accordance with certain embodiments of the invention, the functionalizing agent may be chemically or mechanically deposited in elemental metal form (e.g., cerium metal) onto the surface of the discrete metallic substrates (e.g., feedstock) via, for example, aسputtering process. Sputtering is a technique where a target of desired chemistry is bombarded with energetic particles to transport them via plasma to a surface (e.g., AM feedstock). In this collision driven process it allows mechanical attachment of precise wt percent materials to be allocated to the surface of the feedstock. In accordance with certain embodiments of the invention, the functionalizing agent may comprise europium, cerium, cobalt, molybdenum, tungsten, tantalum, vanadium, chromium, or any combination thereof.

In accordance with certain embodiments of the invention, the functionalizing agent may be electroplated or electroless plated onto the plurality of discrete metallic substrates (e.g., feedstock). The functionalized metallic feedstock, in accordance with certain embodiments, may comprise at least a partial coating layer of the functionalizing agent via an electroplating process or an electroless plating process. In accordance with certain embodiments of the invention, the average thickness of the coating layer (e.g., at least a partial coating layer) of the functionalizing agent via an electroplating process or an electroless plating process may vary as desired since such processes can provide nanometer layer resolution through micron level resolution. In this regard, the average thickness of the coating layer may vary from individual metallic substrate and, in accordance with certain embodiments of the invention, may depend on the ratio of needed to distribute the functionalizing agent throughout the three-dimensional volume of the feedstock (e.g., metallic substrates) being subjected to the coating process. As such, each discrete individual metallic substrate may independently comprise an average coating thickness from about 0.5 nm to about 10 microns. In accordance with certain embodiments of the invention, the functionalizing agent comprises a plated metal that is reactive with a corrosive reagent to form a protective passive layer. In this regard, the plated functionalizing agent may form a partial surface coverage of the plurality of discrete metallic substrates (e.g., feedstock) to allow the uncovered/uncoated surface of the feedstock (e.g., surface area without the plated functionalizing agent) to melt and bond to the nearest adjacent surrounding feedstock substrates to facilitate the AM technique of making three-dimensional articles. Non limiting, examples of the plating metal suitable as a functionalizing agent may include one or more of europium, cerium, cobalt, molybdenum, tungsten, tantalum, vanadium, chromium and other metals that form corrosion-protecting surface films.

In accordance with certain embodiments of the invention, functionalized metallic feedstock formed via, for example, a chemically-deposited surface coating process, a mechano-chemical process, and a plating process as disclosed herein beneficially realizes corrosion protection well in advance of use in an AM process, such as during storage. For instance, once the surfaces of the individual discrete metallic substrates (e.g., metallic feedstock particles) have been coated as disclosed herein, any corrosion of the particles will be slowed down, if not eliminated during storage.

In accordance with certain embodiments of the invention, the functionalized metallic feedstock may be formed during the AM process. For example, powders of one or more functionalizing agents may be integrated into/onto the plurality of discrete metallic substrates (e.g., feedstock) or may be added in layers during the AM process. In this regard, the functionalized metallic feedstock may be formed during the AM process and comprise a dusting/coating of the functionalized agent in powder form that has been melted gently using a high-energy source such as a laser or electron beam. In this regard, the functionalized agent may be coalesced with the main feedstock metal or alloy (e.g., discrete metallic substrates). In accordance with certain embodiments of the invention, the functionalized metallic feedstock may be formed during the AM process by adding the functionalizing agent into the energy source path during formation of the AM-formed article. In accordance with certain embodiments of the invention, the ratios of the powder or the one or more functionalizing agents may be tailored to the resultant weight percent of the AM alloy or metal to the desired modifying elements. In accordance with certain embodiments of the invention, for example, the ratio of the one or more functionalizing agents to the plurality of discrete metallic substrates (e.g., AM alloy or metal) may comprise at most about any of the following: 1:50, 1:75, 1:100, 1:150, 1:200, 1:250, 1:300, 1:350, 1:400, 1:500, 1:550, 1:600, 1:650, 1:700, 1:750, 1:800, 1:850, 1:900, 1:950, and 1:1000 and/or at least about any of the following: 1:10000, 1:8000, 1:7000, 1:6000, 1:5000, 1:4000, 1:3000, 1:2000, 1:1000, 1:900, 1:800, 1:700, 1:600, and 1:500.

In another aspect, the invention provides a method of modifying a metallic feedstock to incorporate a functionalizing agent selected to render the metallic feedstock resistant to corrosion. In accordance with certain embodiments of the invention, the method may comprise providing a plurality of discrete metallic substrates including a first metallic substrate having a first surface area and modifying at least a portion of the first surface area to include the functionalizing agent to provide a functionalized metallic feedstock as disclosed herein. In accordance with certain embodiments of the invention, the step of modifying at least a portion of the first surface area comprises forming a corrosion-resistant surface film comprising the functionalizing agent, physically embedding the functionalizing agent into the at least a portion of the first surface area, plating a metal onto the at least a portion of the first surface area that is reactive with a corrosive reagent to form a protective passive layer, applying the functionalizing agent as a dust-coating onto the plurality of discrete metallic substrates (e.g., during an AM process), introducing the functionalizing agent into the energy source during an AM process, or any combination thereof.

In accordance with certain embodiments of the invention, the step of modifying at least a portion of the surface area of at least a portion of the metallic feedstock may comprise subjecting the plurality of metallic substrates (e.g., feedstock) to a chemically-deposited surface coating process. For example, plurality of metallic substrates (e.g., feedstock) may be stirred/mixed in, for example, an aqueous solution containing (i) a chemical species capable of dissolving weak oxide layers that may be present on the surfaces of the plurality of metallic substrates and (ii) one or more functionalizing agents that can fill any voids formed in the surfaces of the plurality of metallic substrates formed by dissolution of any weak oxide layers as well as form a corrosion-resistant surface layer containing the one or more functionalizing agents.

In accordance with certain embodiments of the invention, the step of modifying at least a portion of the surface area of at least a portion of the metallic feedstock may comprise subjecting the plurality of metallic substrates to one or more mechanical and/or chemical processes. For example, the plurality of discrete metallic substrates (e.g., feedstock) may be mechanically modified via a ball milling operation. In accordance with certain embodiments of the invention, for example, the plurality of discrete metallic substrates (e.g., feedstock) may be mechanically mixed with trace amounts of functionalizing agent (e.g., metallic powder) and then this mixture may be fed to a ball mill or the like to modify the surface of the plurality of discrete metallic substrates (e.g., feedstock) through mechano-chemical processes. In this regard, for example, the functionalizing agent may be physically adhered or embedded (at least partially) onto and/or into at least a portion the surface of at least a majority of the discrete metallic substrates (e.g., feedstock). In accordance with certain embodiments of the invention, the functionalizing agent may be vapor deposited in elemental metal form (e.g., cerium metal) onto the surface of the discrete metallic substrates (e.g., feedstock) via, for example, a sputtering process.

In accordance with certain embodiments of the invention, the step of modifying at least a portion of the surface area of at least a portion of the metallic feedstock may comprise plating one or more metal coatings (e.g., partial coating) of one or more functionalizing agents. Modification of the plurality of metallic substrates to provide a functionalized metallic feedstock may comprise electroplating or electroless plating a metal (e.g., functionalizing agent) that is reactive with a corrosive reagent to form a protective passive layer. In accordance with certain embodiments of the invention, the selection of the plating metal (e.g., functionalizing agent) comprises a material that reacts instantly in presence of a corrosive reagent to quickly form a protective passive layer around the plurality of metallic substrates. In this regard, the plated functionalizing agent may form a partial surface coverage of the plurality of discrete metallic substrates (e.g., feedstock) to allow the uncovered/uncoated surface of the feedstock (e.g., surface area without the plated functionalizing agent) to melt and bond to the nearest adjacent surrounding feedstock substrates to facilitate the AM technique of making three-dimensional articles.

In accordance with certain embodiments of the invention, the step of modifying at least a portion of the surface area of at least a portion of the metallic feedstock may comprise depositing a layer of one or more functionalizing agents, for example in powder form, across a layer of a plurality of discrete metallic substrates (e.g., feedstock) during an AM process. In this regard, for example, a layer of discrete metallic substrates (e.g., feedstock) may be laid in place followed by providing a coating/dusting of one or more functionalizing agents onto the layer of discrete metallic substrates. Once the one or more functionalizing agents are deposited onto the layer of discrete metallic substrates, the one or more functionalizing agents may be gently melted using a high-energy source such as a laser or electron beam. In this regard, the functionalized agent may be coalesced with the main feedstock metal or alloy (e.g., discrete metallic substrates). Next, an additional layer of discrete metallic substrates (e.g., feedstock) may be deposited in accordance with standard AM processes. For example, AM processes involve building three-dimensional structures layer-by-layer. In this regard, a coating/dusting layer of one or more functionalizing agents can be deposited after each successive layer deposition of feedstock material, such that a coating/dusting of the one or more functionalizing agents is located at least partially between each layer of feedstock material. While preforming any or all the steps described in any and all AM processes, several intermediate steps in which a dusting of powdered functionalizing agent(s) may be deposited between the layers of the feedstock material.

In accordance with certain embodiments of the invention, the step of modifying at least a portion of the surface area of at least a portion of the metallic feedstock may comprise introducing one or more functionalizing agents (e.g., powder form) into the energy source path during formation of the AM-formed article. In accordance with certain embodiments of the invention, the one or more functionalizing agents may be introduced during an AM process in a separate stream from the plurality of discrete metallic substrates (e.g., feedstock) used to form each layer of the 3D metallic article being manufactured. In accordance with certain embodiments of the invention, the one or more functionalizing agents may be intermittently added in a layer-by-layer method in which a layer of the one or more functionalizing agents is deposited between each successive layer of the feedstock as the article is being manufactured. In accordance with certain embodiments of the invention, the introduction of the one or more functionalizing agents may be deposited throughout the three-dimensional volume of the article in small quantities enabling corrosion protection throughout the three-dimensional volume of the article.

In accordance with certain embodiments of the invention, the method may comprise any combination of the proceeding methods of modifying the discrete metallic substrates to impart three-dimensional corrosion protection to a 3D metallic article formed from an AM process to protect the article against propagation of localized corrosion through the article's three-dimensional volume.

In another aspect, the present invention provides a three-dimensional metallic article. In accordance with certain embodiments of the invention, the 3D metallic article may comprise a surface area (e.g., an external surface area) formed from one or more metals and an internal volume formed from the one or more metals (e.g., three-dimensional bulk material). In accordance with certain embodiments of the invention, at least a portion of the surface area comprises one or more functionalizing agents provided in the form of an external corrosion-resistant oxide film comprising the one or more functionalizing agents and at least a portion of the internal volume comprises one or more functionalizing agents provided in the form of one or more internal corrosion-resistant oxide films comprising the one or more functionalizing agents. In accordance with certain embodiments of the invention, the 3D metallic article comprises an article formed from an additive manufacturing process. In accordance with certain embodiments of the invention, the one or more internal corrosion-resistant oxide films comprise a 3D internal network extending continuously or discontinuously (e.g., a series of localized corrosion-resistant surface films) throughout a bulk material forming the internal volume of the 3D metallic article.

In yet another aspect, the invention provides a method for forming a three-dimensional metallic article. In accordance with certain embodiments of the invention, the method comprises successively building up the article from a metallic feedstock via an additive manufacturing process. In accordance with certain embodiments of the invention, the metallic feedstock comprises a plurality of discrete metallic substrates having a functionalizing agent incorporated thereon (e.g., directly as an surface film containing the functionalizing agent or indirectly as a dusting of the surface with the functionalizing agent), in which the functionalizing agent may be selected to render the plurality of discrete metallic substrates resistant to corrosion. In accordance with certain embodiments of the invention, the additive manufacturing process comprises material extrusion, material jetting, binder jetting, sheet lamination, powder bed fusion, and directed energy systems such as selective laser melting (SLM), selective laser sintering (SLS), electron beam melting (EBM), electron beam additive manufacturing (EBAM), laser metal forming (LMF), laser engineered net shape (LENS), or direct metal deposition (DMD).

As such, certain embodiments in accordance with the invention provide procedures to protect three-dimensional metal articles that have been fabricated using an AM process from pitting, stress corrosion cracking, and/or corrosion-induced structural failures. AM processes known in the art routinely use feedstock materials, such as powder and filament forms, of metals and alloys to make three dimensional articles. As disclosed herein, certain embodiments in accordance with the invention may comprise the infusion of, for example, trace amounts of selected materials (e.g., functionalizing agents disclosed herein) into or on the surface of most of the particles in the feedstock that protects each particle from corrosion. When the feedstock particles empowered with corrosion protection ability are used as the feedstock material for making three-dimensional metallic articles, the article is protected from corrosion at its surface as well as throughout its bulk (e.g., three-dimensional volume). Stated somewhat differently, certain embodiments in accordance with the invention enable three-dimensional corrosion protection to the metallic article, which is an unprecedented practice in the field of metallurgy and materials.

EXAMPLES

The present disclosure is further illustrated by the following examples, which in no way should be construed as being limiting. That is, the specific features described in the following examples are merely illustrative and not limiting.

Example 1: Corrosion Protection Through Chemical Deposition

In this example, the effect of chemically-deposited surface coating on the corrosion of Ti-6Al-4V 3D AM alloy is illustrated. First, two 3D objects were fabricated through an AM process using Ti-6Al-4V powder as the feedstock. The feedstock of the first object was chemically-deposited surface coating using an aqueous solution containing cerium ions and nitrate ions while the feedstock for the second object (i.e., the control) was left uncoated. Both objects were then subjected to an accelerated corrosion test to determine the effect of the conversion coating on corrosion.

The long-held view that the surfaces of most alloys are covered with a corrosion-resistant oxide layer is recognized. Such oxide layers do exist on alloys of all shapes and sizes, including nanometer- and micrometer-size alloy particles. The oxide layer almost always exhibits strong resistance to corrosion in most locations, but weak resistance to corrosion in some locations. Corrosion attack almost always takes place in those locations where the oxide layer is weak. The chemically-deposited surface coating repairs the weak locations in the oxide layer without disturbing the rest of the locations that are strong.

The feedstock chemically-deposited surface coating approach disclosed herein forces the weak locations to dissolve away, and fills up the void with an alternate oxide that is strong and resistant to corrosion with no modification to the mechanical and metallurgical properties of the particle. For example, in the case of titanium-aluminum-vanadium alloys (Ti-6Al-4V), most of the surface is covered with corrosion-resistant titanium oxide, but some locations are covered with aluminum oxide. The localized aluminum oxide is much more prone to corrosion attack leading to localized pitting, which then can propagate three-dimensionally into the bulk of the object leading to stress, fracture and failure of the structure. Therefore the key to protecting the Ti-6Al-4V alloy involves replacing the corrosion-prone aluminum oxide with a corrosion-resistant substitute, for example, cerium oxide. This is best demonstrated using 3D discs of Ti-6Al-4V AM alloy whose surface was subject to chemically-deposited surface coating and then subject to corrosion in a strong solution of sodium chloride (600 millimolar concentration) that is as corrosive as seawater.

Figure 2:
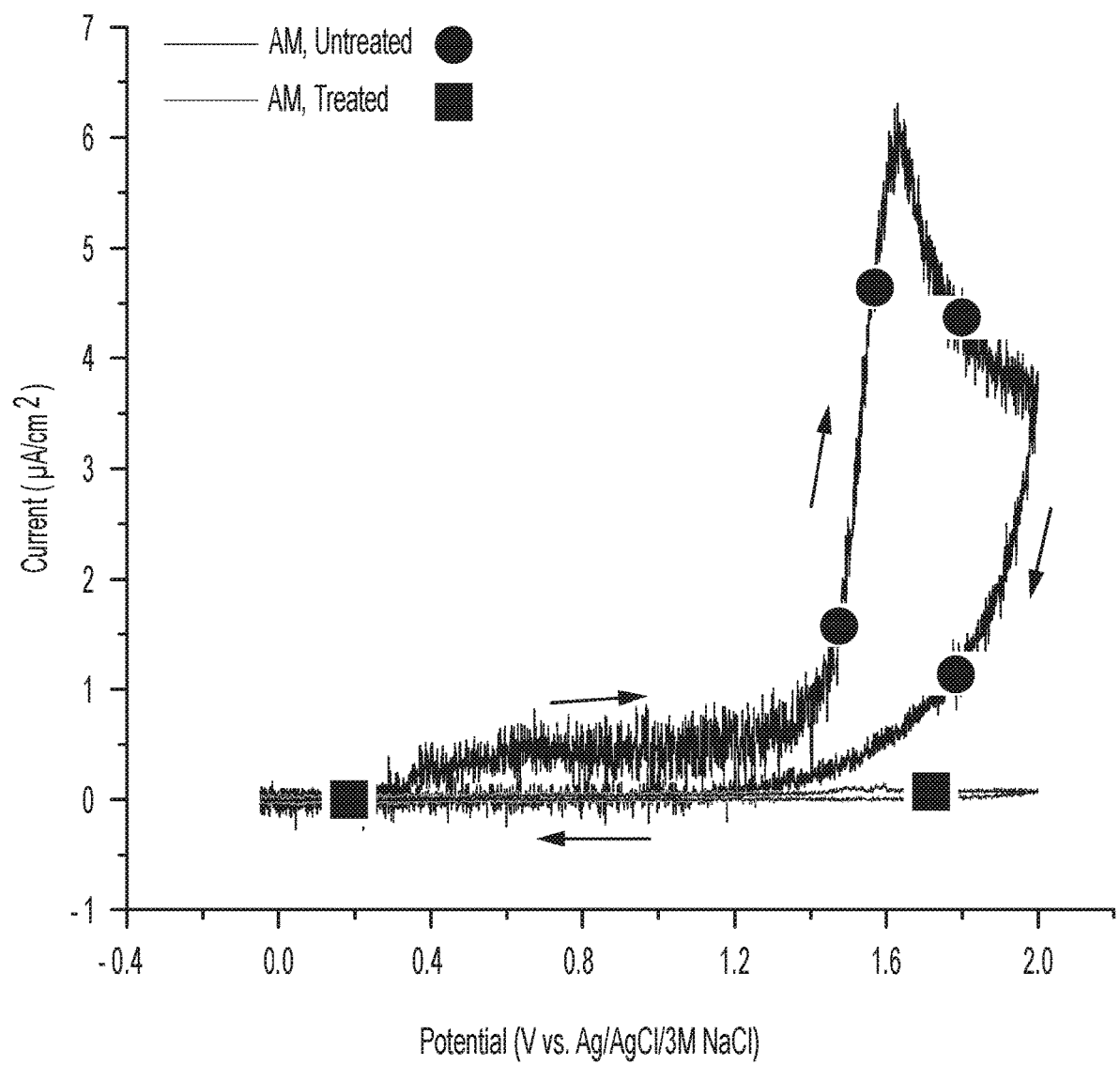
FIG. 2 illustrates an ASTM-G61 potentiodynamic scan data of chemically-treated and untreated Ti-6Al-4V AM alloy disc samples immersed in an aqueous solution containing 600-millimolar sodium chloride.

The data illustrated in FIG. 2 shows accelerated corrosion rate data based on the ASTM-G61 protocol, "Standard Test Method for Conducting Cyclic Potentiodynamic Polarization Measurements for Localized Corrosion Susceptibility of Iron-, Nickel-, or Cobalt-Based Alloys." In the ASTM-G61 protocol, the alloy under test is immersed in the corrosive medium (such as simulated sweater), and subject an increasing electrical polarization. Starting from the open-circuit-potential (also referred to as "corrosion potential" or $E_{corr}$) of the alloy in the corrosive medium, a potential that is increasing slowly in the positive direction is applied to the test sample. The increase is gradual, and the recommended rate is 10 millivolt per minute (or 0.167 mV/s). As the voltage increases, one in required to monitor the current flowing from the metal surface into the corrosive medium. Any sustained increase in the current is representative of formation of one or more pits on the metal surface, and the potential at which the pitting occurs is called pitting potential or $E_{pit}$. The voltage separation between $E_{pit}$ and $E_{corr}$ is an indicator of the alloy's susceptibility to pitting corrosion in that corrosion medium.

Figure 3A:
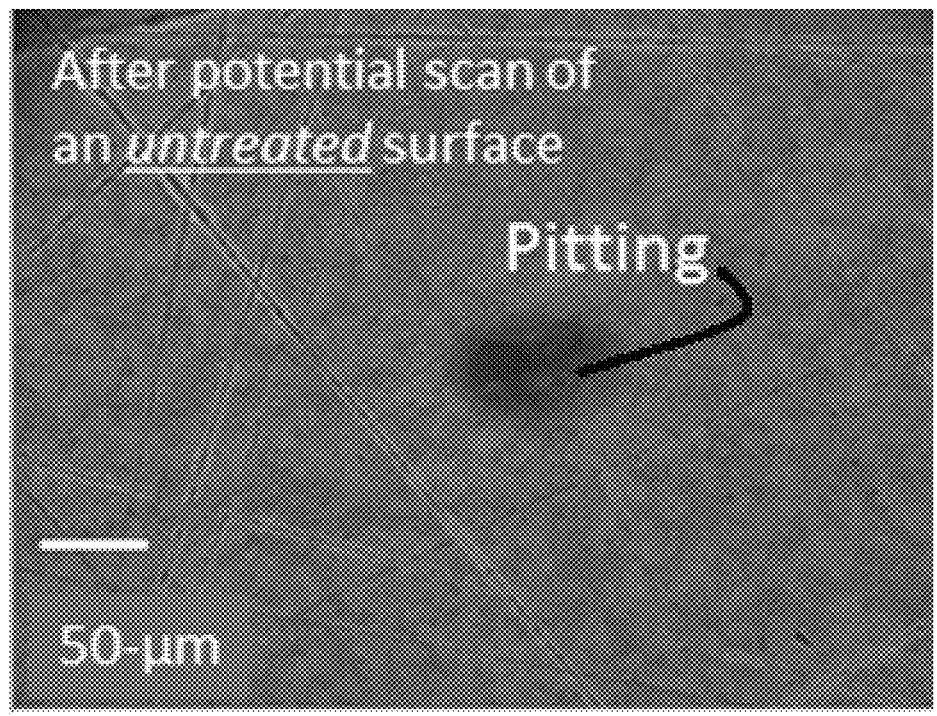
FIG. 3A is an optical micrograph of Ti-6Al-4V AM alloy sample having an untreated surface immersed in 600-millimolar sodium chloride solution and subject to potentiodynamic scanning based on ASTM-G61 protocol, in which the untreated surface showed a large current as illustrated in the data plotted on FIG. 2 and showed evidence of pitting.
Figure 3B:
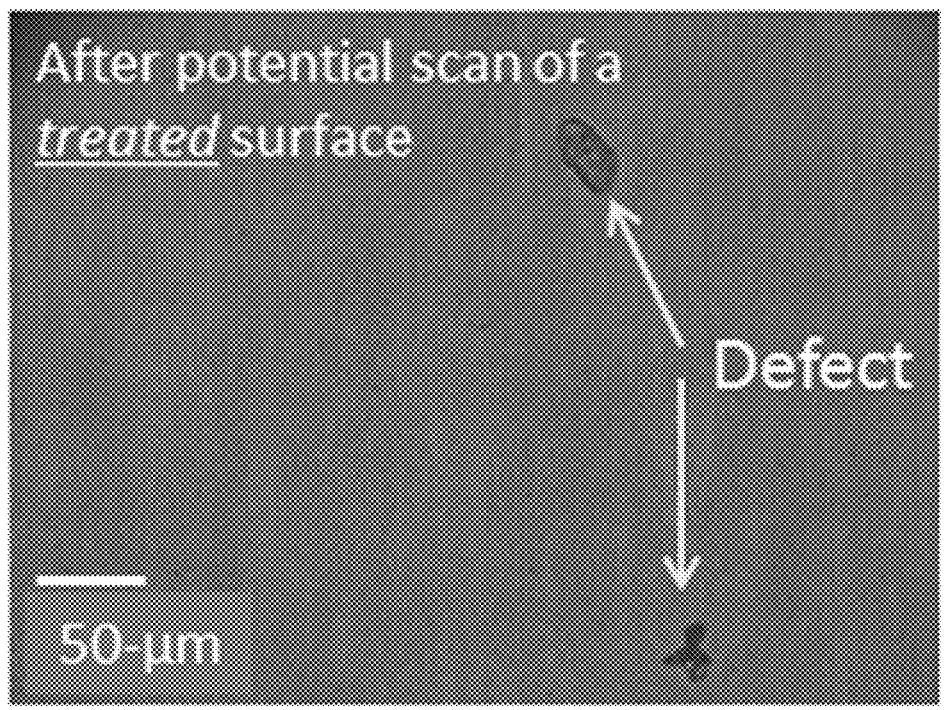
FIG. 3B is an optical micrograph of Ti-6Al-4V AM alloy sample having a treated surface immersed in 600-millimolar sodium chloride solution and subject to potentiodynamic scanning based on ASTM-G61 protocol, in which the treated surface showed little current in the data plotted on FIG. 2 and showed no evidence of pitting even though the test sample had pre-existing surface defects.

The data plotted in FIG. 2 shows that the AM alloy with untreated surface exhibited a huge current; however, the same alloy with treated surface exhibited little or no current over the entire 2-Volt range. As per the ASTM-G61 protocol, the AM alloy with the treated surface was protected from corrosion. Confirmation of the absence of pitting in the treated surface through further observing the alloy surfaces under an optical microscope was conducted. FIGS. 3A (untreated surface) and 3B (treated surface) show the optical micrographs taken after the potentiodynamic scan tests shown in FIG. 2. In the example shown, it is believed that the chemically-deposited surface coating process removed the weak portions of the aluminum oxide. In this example, a cerium nitrate solution was used to treat the surface of the AM alloy. Nitrate is a water-soluble oxidizing agent that chemically attacks and removes the weaker portions of the surface aluminum oxide. As soon as the aluminum oxide is removed, cerium fills in the void with a stronger cerium oxide. In some instances, an adjustment of the pH of the aqueous solution toward the acidic (pH 1 to 2) or basic (pH 10 to 11) range may be helpful to force the dissolution of the weak oxide.

Example 2: Evidence for the Incorporation of Cerium in the Surface Oxide Layer

Figure 4A:
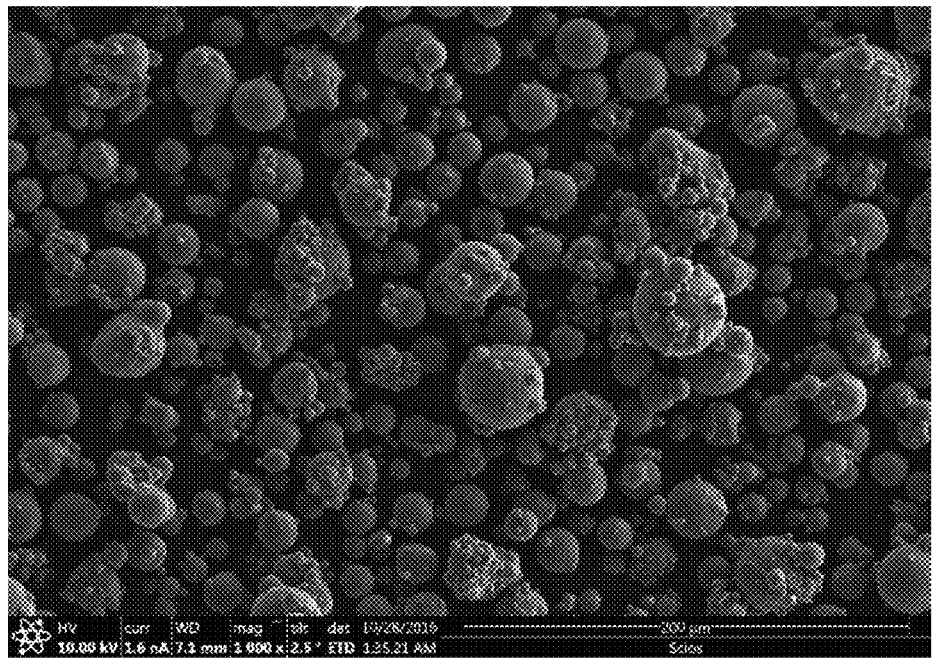
FIG. 4A is a Scanning Electron Microscope (SEM) image of an uncoated/untreated AM feedstock material AlSi10Mg alloy powder in which the spherical objects seen in the image are the particles of the uncoated/untreated alloy powder.
Figure 4B:
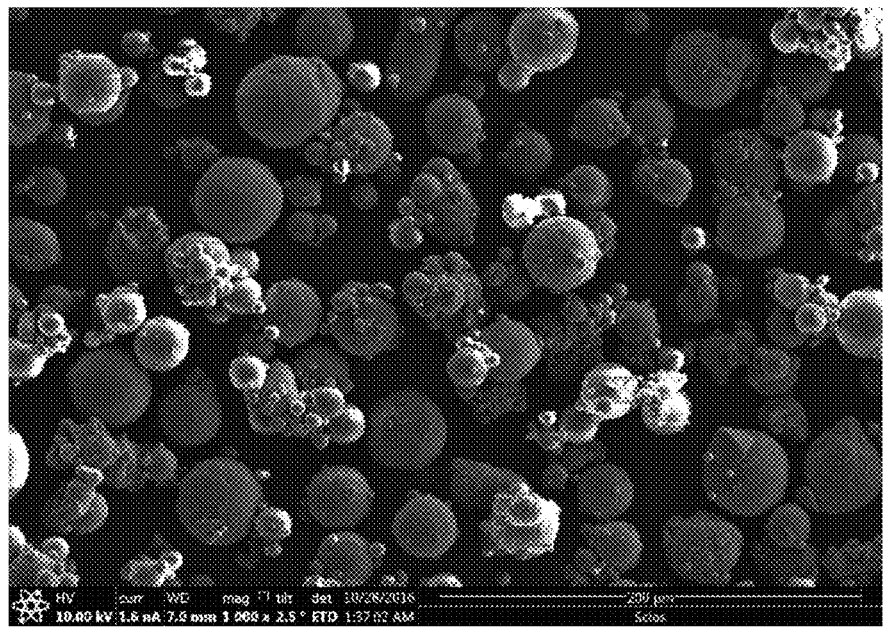
FIG. 4B is a Scanning Electron Microscope (SEM) image of a chemically-deposited surface-coated AM feedstock material AlSi10Mg alloy powder in which the spherical objects seen in the image are the particles of the chemically-deposited surface-coated alloy powder.
Figure 5A:
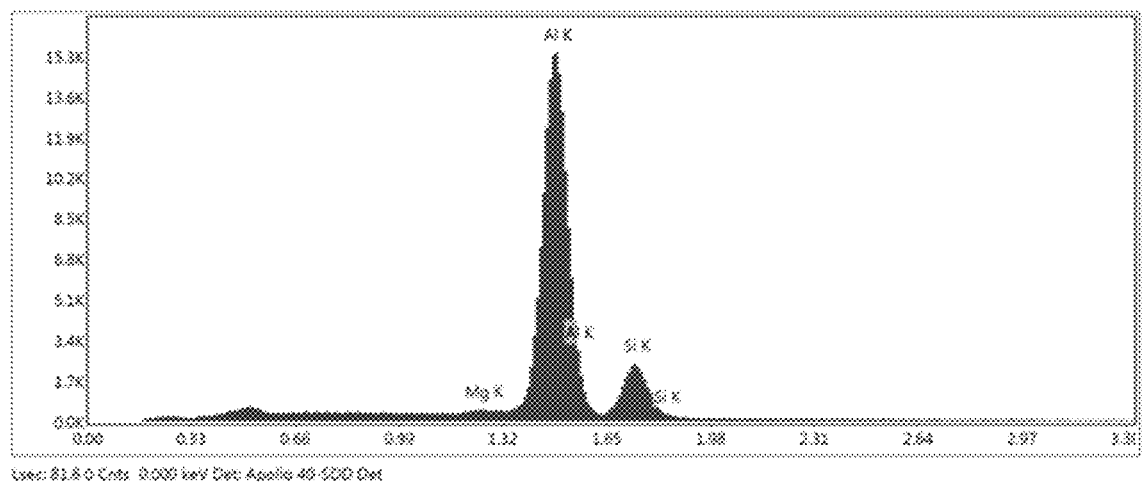
FIG. 5A is an Energy-Dispersive X-Ray Spectroscopy (EDS) spectrum of uncoated/untreated AM feedstock material AlSi10Mg alloy powder, in which the spectrum shows peaks corresponding to the alloying elements, magnesium (Mg), aluminum (Al), and silicon (Si)

Evidence of the incorporation of the corrosion inhibiting chemical getting incorporated in the surface oxide layer of the alloy particles used as the AM feedstock material is discussed below. In this example, the cerium nitrate chemically-deposited surface coating protocol on an AlSi10Mg alloy powder was performed. The treated powder was tested using Scanning Electron Microscope (SEM) for qualitative observation, and Energy-Dispersive X-Ray Spectroscopy (EDS) for quantitative estimation of the cerium in the alloy. For comparison purposes, an untreated AlSi10Mg alloy powder we also tested. FIG. 4A, for instance, is the SEM image of the uncoated/untreated AM feedstock material AlSi10Mg alloy powder, in which the spherical objects seen in the image are the particles of the uncoated/untreated alloy powder. FIG. 4B is the Scanning Electron Microscope (SEM) image of the chemically-deposited surface-coated AM feedstock material Al alloy powder, in which the spherical objects seen in the image are the particles of the chemically-deposited surface-coated alloy powder. The images from FIGS. 4A and 4B alone may not prove or disprove the presence of cerium-based surface layer on the surface of the particles. However, the EDS spectrum for the untreated AM feedstock and the chemically-deposited surface-coated AM feedstock confirms the incorporation of cerium in the alloy. FIG. 5A is an EDS spectrum of the uncoated/untreated AM feedstock material AlSi10Mg alloy powder, in which the spectrum shows peaks corresponding to the alloying elements, magnesium (Mg), aluminum (Al), and silicon (Si). Table 1 provides a summary of the elemental composition of the untreated AlSi10Mg alloy powder whose EDS spectrum is shown in FIG. 5A.

TABLE 1

| Element | Weight % | Atomic % | Net Int. | Error % | Kratio | Z | R | A | F |
|---|---|---|---|---|---|---|---|---|---|
| MgK | 1.8 | 2.0 | 50.0 | 8.5 | 0.0190 | 1.0421 | 0.9935 | 0.9946 | 1.0444 |
| AlK | 82.1 | 82.5 | 1797.8 | 5.2 | 0.8198 | 0.9968 | 0.9933 | 0.9977 | 1.0035 |
| SiK | 16.1 | 15.5 | 268.1 | 6.8 | 0.1539 | 1.0120 | 1.0042 | 0.9429 | 1.0020 |

Figure 5B:
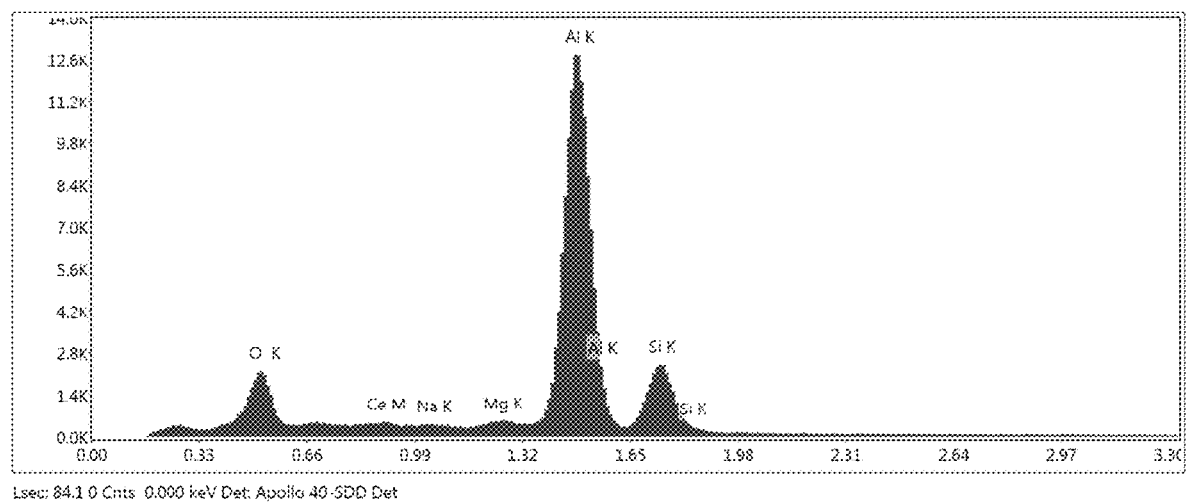
FIG. 5B is an Energy-Dispersive X-Ray Spectroscopy (EDS) spectrum of chemically-deposited surface-coated AM feedstock material AlSi10Mg alloy powder, in which the spectrum shows peaks corresponding to the alloying elements, including Al, Mg, Si and cerium (Ce)

As shown in FIG. 5A and Table 1, the untreated AlSi10Mg alloy powder did not contain any cerium atoms. FIG. 5B is an EDS spectrum of the chemically-deposited surface-coated AM feedstock material AlSi10Mg alloy powder, in which the spectrum shows peaks corresponding to the alloying elements, including Al, Mg, Si and cerium (Ce). Table 2 provides a summary of the elemental composition of the chemically-deposited surface-coated AlSi10Mg alloy powder whose EDS spectrum is shown in FIG. 5B.

TABLE 2

| Element | Weight % | Atomic % | Net Int. | Error % | Kratio | Z | R | A | F |
|---|---|---|---|---|---|---|---|---|---|
| Ce 2O3 | 6.6 | 1.8 | 21.5 | 10.8 | 0.0719 | 0.5894 | 1.2631 | 1.1929 | 0.9998 |
| Na 2O | 0.4 | 0.5 | 10.9 | 17.5 | 0.0043 | 0.9805 | 0.9949 | 0.9357 | 1.0015 |

TABLE 2-continued

| Element | Weight % | Atomic % | Net Int. | Error % | Kratio | Z | R | A | F |
|---|---|---|---|---|---|---|---|---|---|
| Mg O | 1.6 | 3.5 | 43.1 | 8.7 | 0.0162 | 0.9901 | 1.0009 | 0.9629 | 1.0031 |
| Al 2O3 | 72.3 | 64.9 | 1426.1 | 5.4 | 0.6425 | 0.9470 | 1.0060 | 0.9780 | 1.0015 |
| Si O2 | 19.2 | 29.2 | 264.9 | 6.6 | 0.1502 | 0.9613 | 1.0104 | 0.9619 | 1.0013 |

As shown in FIG. 5B and Table 2, the chemically-deposited surface-coated AlSi10Mg alloy powder includes incorporation of cerium atoms. That is, the EDS spectrum in FIG. 5B and the data in Table 2 show clear evidence for the presence of cerium oxide in the feedstock AlSi10Mg alloy powder. In this example, cerium is present in quantities of approximately 1.8 atomic %. EDS spectrum taken in other locations of the sample showed smaller quantity of cerium, in some locations, as low as 0.5 atomic %. Such a range of distribution of concentration is expected in most coated samples, because the weak locations of the original oxide (aluminum oxide) are rarely distributed uniformly across the entire sample. Under the assumption that the chemically-deposited surface coating has replaced all the weak aluminum oxide in most, if not all the particles, with cerium oxide, the chemically-deposited surface-coated feedstock material could be considered as "robust" from its ability to resist corrosion Example 3: Preventing Pitting Corrosion in 316L AM Alloy In this example, the impact of surface modification of a 316L AM alloy feedstock in accordance with certain embodiments of the invention is illustrated. Pitting corrosion is a localized form of corrosion and as little as 1% or less of the surface may experience such a form of corrosion, especially in 316L. However, the structure made of the 316L alloy could experience catastrophic failure due to pitting corrosion. It was hypothesized that the 316L alloy's surface is covered with chromium oxide that facilitates the prevention of the surface from corroding; however, this oxide is weak in some locations and is susceptible to corrosion.

Figure 6:
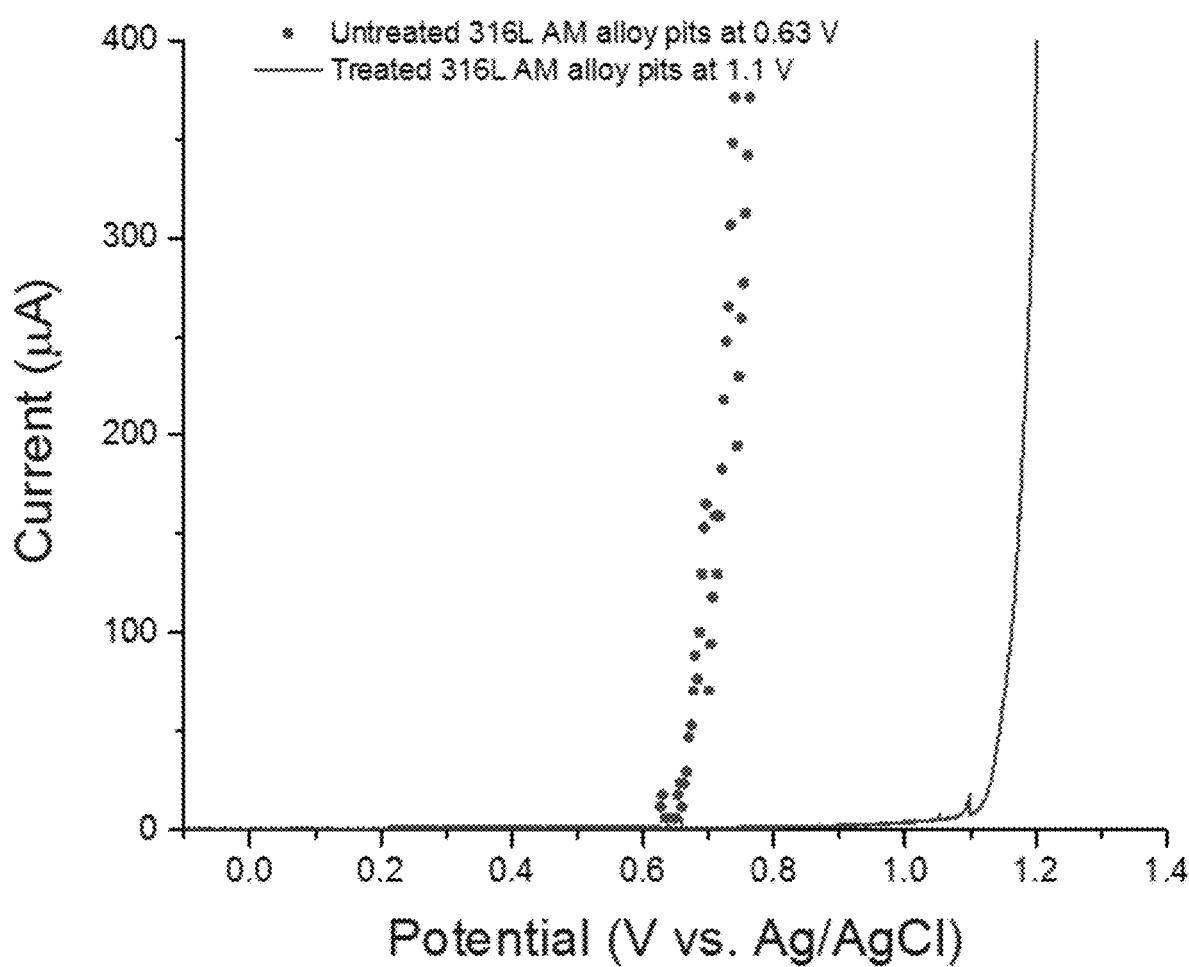
FIG. 6 illustrates an ASTM-G61 potentiodynamic scan data of chemically-treated and untreated 316L AM alloy immersed in an aqueous solution containing 0.6 m sodium chloride.

In this example, a 316L AM alloy powder feedstock was treated with an admixture of cerium, vanadium, molybdenum anions and nitrate cations. It was hypothesized that treatment of the surface of the 316L AM alloy powder feedstock with an appropriate chemical agent (e.g., functionalizing agent) would reinforce the chromium oxide layer, if only at the weaker location, and help prevent pitting corrosion. As a control, an untreated portion of the 316L AM alloy powder feedstock was utilized to provide a comparative sample. In this regard, a ASTM-G61 protocol to test the pitting susceptibility of treated and untreated 316L AM alloys in 0.6 m sodium chloride was conducted. FIG. 6 illustrates the ASTM-G61 potentiodynamic scan data of the chemically-treated and untreated (e.g., control sample) 316L AM alloy feedstock immersed in an aqueous solution containing 0.6 m sodium chloride. As shown in FIG. 6, the untreated sample showed pitting at 0.63V while the treated sample resisted pitting until 1.1V. In this regard, the functionalization of the 316L AM alloy powder feedstock provided greater resistance to pitting.

Example 4: Mechano-Chemical Addition of Cerium on Metal Feedstock

In accordance with certain embodiments of the invention, the functionalizing agent may be chemically or mechanically deposited in elemental metal form (e.g., cerium metal) onto the surface of the discrete metallic substrates (e.g., feedstock) via, for example, a sputtering process. Sputtering is a technique where a target of desired chemistry is bombarded with energetic particles to transport them via plasma to a surface (e.g., AM feedstock). In this collision driven process, it allows mechanical attachment of precise weight percent materials to be allocated to the surface of the feedstock. In addition to sputtering, ball milling is a process where mechanical energy is given via impact energy from a metal or ceramic ball typically larger than the feedstock material. This allows the kinetic energy of the collision to incorporate the desired element (e.g. cerium) onto the surface of the AM feedstock.

Figure 7:
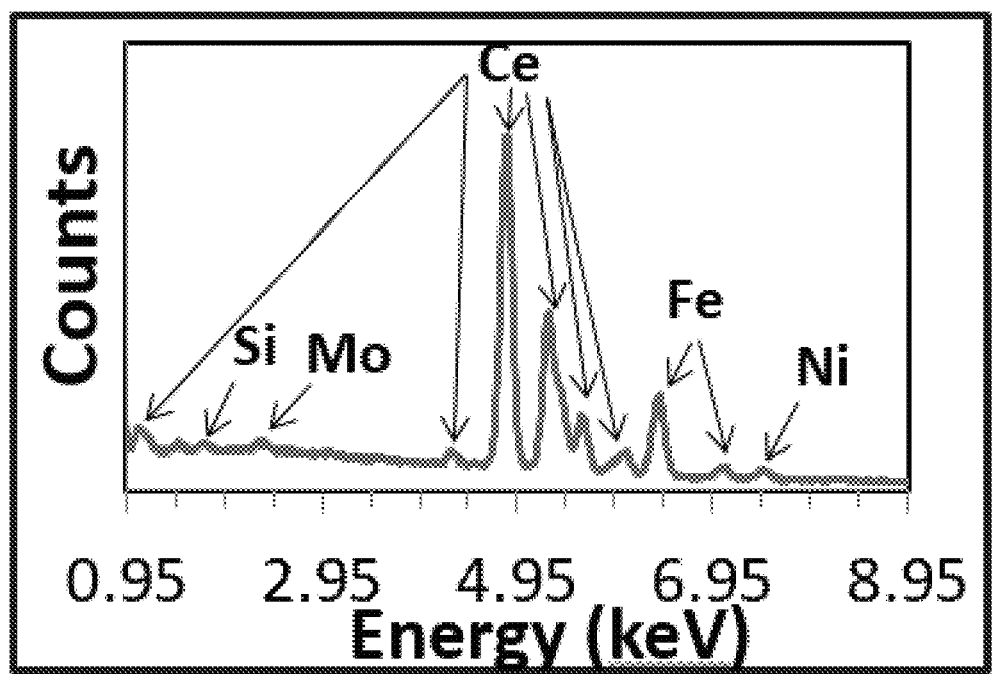
FIG. 7 is an Energy-Dispersive X-Ray Spectroscopy (EDS) spectrum that shows the successful integration of an inner transition metal element (e.g., cerium) on to the surface of individual particles constituting an AM material feedstock.

FIG. 7 is an Energy-Dispersive X-Ray Spectroscopy (EDS) spectrum that shows the successful integration of a lanthanide series element (e.g., cerium) on to the surface of individual particles constituting an AM material feedstock. Interestingly, the EDS spectrum shows that the element (Ce) is present on the metallic AM feedstock particle surface even after the powder (e.g., metallic AM feedstock particles) has been mechanically agitated. This indicates that the functionalizing agent (i.e., metal cerium) adheres to the surface of the metallic AM feedstock particles. In this example, this was accomplished via a sputtering technique which may be characterized as a mechano-chemical process. As noted previously, an alternative mechano-chemical process may comprise a process such as ball milling. FIGS. 8A-8C are Scanning Electron Microscope (SEM) images of the treated/coated metallic AM particles formed by . . . . FIG. 8A is a SEM image of the metallic AM particle having cerium metal incorporated into the external surface of the metallic AM particle, while FIG. 8B is an enlarged/magnified SEM image of a portion of the image from FIG. 8A. FIG. 8C is an enlarged/magnified SEM image of a portion of the image from FIG. 8B. As illustrated in FIGS. 8A-8C, the metallic AM particles 20 treated/coated with metal cerium 25 via a sputtering technique.

These and other modifications and variations to the invention may be practiced by those of ordinary skill in the art without departing from the spirit and scope of the invention, which is more particularly set forth in the appended claims. In addition, it should be understood that aspects of the various embodiments may be interchanged in whole or in part. Furthermore, those of ordinary skill in the art will appreciate that the foregoing description is by way of example only, and it is not intended to limit the invention as further described in such appended claims. Therefore, the spirit and scope of the appended claims should not be limited to the exemplary description of the versions contained herein.

What is claimed is:

1. A method of modifying a metallic feedstock, comprising:
providing a plurality of discrete metallic substrates including a first metallic substrate particle having a first surface area; wherein the plurality of discrete metallic substrates comprises an average diameter from about 0.01 to about 2000 microns, wherein the plurality of discrete metallic substrates comprises a cobalt-based alloy, a chromium-based alloy, a nickel-based alloy, a titanium-based alloy, a stainless steel, or any combination thereof; and modifying at least a portion of the first surface area to include a functionalizing agent to provide a functionalized metallic feedstock, the step of modifying the at least a portion of the first surface area comprising introducing the functionalizing agent into an energy source during an additive manufacturing (AM) process, wherein (i) the functionalized metallic feedstock includes the plurality of discrete metallic substrates, and wherein the plurality of discrete metallic substrates collectively comprises from about 0.02 atomic % to about 5 atomic % of the functionalizing agent as determined by Energy-dispersive X-Ray Spectroscopy, and at least a portion of the first surface area includes the functionalizing agent selected to render the first metallic substrate resistant to corrosion; wherein the functionalizing agent comprises europium, cerium, vanadium, or any combination thereof; or (ii) the functionalized metallic feedstock includes the plurality of discrete metallic substrates, and wherein the plurality of discrete metallic substrates collectively comprises from about 0.02 atomic % to about 3 atomic % of the functionalizing agent as determined by Energy-dispersive X-Ray Spectroscopy, and at least a portion of the first surface area includes the functionalizing agent selected to render the first metallic substrate resistant to corrosion; wherein the functionalizing agent comprises europium, cerium, tungsten, tantalum, vanadium, or any combination thereof.

2. The method of claim 1, wherein the step of modifying the at least a portion of the first surface area further comprises forming a corrosion-resistant film comprising the functionalizing agent, physically embedding the functionalizing agent into the at least a portion of the first surface area, plating the functionalizing agent in elemental metal form onto the at least a portion of the first surface area that is reactive with a corrosive reagent to form a protective passive layer, applying the functionalizing agent as a dust-coating onto the plurality of discrete metallic substrates, or any combination thereof.

3. The method of claim 1, wherein the step of modifying the at least a portion of the first surface area further comprises plating the functionalizing agent in elemental metal form onto the at least a portion of the first surface area.

4. A method of modifying a metallic feedstock, comprising:

providing a plurality of discrete metallic substrates including a first metallic substrate particle having a first surface area; wherein the plurality of discrete metallic substrates comprises an average diameter from about 0.01 to about 2000 microns; and modifying at least a portion of the first surface area to include a functionalizing agent to provide a functionalized metallic feedstock, wherein the step of modifying the at least a portion of the first surface area comprises introducing the functionalizing agent into an energy source during an additive manufacturing (AM) process, the functionalized metallic feedstock includes the plurality of discrete metallic substrates, and at least a portion of the first surface area includes the functionalizing agent selected to render the first metallic substrate resistant to corrosion; wherein the functionalizing agent comprises europium, cerium, cobalt, molybdenum, tungsten, tantalum, vanadium, or any combination thereof.

* * * * *